United States Patent
Powell

(10) Patent No.: US 9,071,328 B2
(45) Date of Patent: Jun. 30, 2015

(54) TRANSCEIVER WITH AUTOMATIC DETECTION OF UNSHIELDED TWISTED PAIR OR SHIELDED TWISTED PAIR CABLING

(75) Inventor: Scott Powell, Carlsbad, CA (US)

(73) Assignee: Broadcom Corporation, Irvine, CA (US)

( * ) Notice: Subject to any disclaimer, the term of this patent is extended or adjusted under 35 U.S.C. 154(b) by 338 days.

(21) Appl. No.: 13/614,725

(22) Filed: Sep. 13, 2012

(65) Prior Publication Data

US 2013/0064065 A1 Mar. 14, 2013

Related U.S. Application Data

(63) Continuation of application No. 11/610,381, filed on Dec. 13, 2006, now Pat. No. 8,290,027.

(60) Provisional application No. 60/751,990, filed on Dec. 21, 2005.

(51) Int. Cl.
  *H04B 1/38* (2006.01)
  *H04B 3/20* (2006.01)
  *H04B 3/32* (2006.01)
  *H04L 12/40* (2006.01)

(52) U.S. Cl.
  CPC .. *H04B 3/20* (2013.01); *H04B 3/32* (2013.01); *H04L 12/40032* (2013.01)

(58) Field of Classification Search
  CPC ..... H04B 30/20; H04B 3/32; H04L 12/40032
  See application file for complete search history.

(56) References Cited

U.S. PATENT DOCUMENTS

| | | | |
|---|---|---|---|
| 4,649,505 A | 3/1987 | Zinser, Jr. et al. | |
| 5,731,706 A * | 3/1998 | Koeman et al. | 324/628 |
| 5,991,271 A * | 11/1999 | Jones et al. | 370/252 |
| 6,160,790 A | 12/2000 | Bremer | |
| 7,046,751 B1 | 5/2006 | Kantschuk et al. | |
| 8,009,823 B2 | 8/2011 | Parhi et al. | |
| 2002/0159313 A1 | 10/2002 | Miyanabe et al. | |
| 2002/0181633 A1 | 12/2002 | Trans | |
| 2003/0099289 A1 | 5/2003 | Birru | |
| 2003/0230427 A1* | 12/2003 | Gareis | 174/113 C |
| 2004/0218756 A1 | 11/2004 | Tang et al. | |
| 2005/0030884 A1 | 2/2005 | Kim et al. | |
| 2005/0074055 A1 | 4/2005 | Takatori et al. | |
| 2005/0099967 A1 | 5/2005 | Baba | |
| 2005/0123081 A1 | 6/2005 | Shirani | |
| 2005/0163207 A1 | 7/2005 | Buckwalter et al. | |
| 2006/0133303 A1 | 6/2006 | Shida | |
| 2007/0030014 A1 | 2/2007 | Pandya et al. | |
| 2007/0121663 A1 | 5/2007 | Yousefi et al. | |
| 2007/0143811 A1 | 6/2007 | Powell | |

* cited by examiner

*Primary Examiner* — Kenny Lin
(74) *Attorney, Agent, or Firm* — Sterne, Kessler, Goldstein & Fox P.L.L.C.

(57) ABSTRACT

Typical transceivers have multiple near-end and multiple far-end crosstalk cancellation filters. Crosstalk cancellation is one of the largest contributors to power dissipation in the DSP portion of high speed Ethernet transceivers. By detecting the cable type, a transceiver could automatically turn off its crosstalk cancellation filters when driving shielded twisted pair (STP) cables and substantially reduce the overall power dissipation in this configuration. Adaptive digital crosstalk cancellers automatically adjust the coefficients of a digital filter to match the coupling function between two channels. The impulse response of an optimal crosstalk cancellation filter can be used to determine a metric indicating the amount of coupling between the two channels. STP cables will have a much lower amount of coupling between wire-pairs than unshielded twisted pair cables.

20 Claims, 8 Drawing Sheets

TRANSCEIVER WITH AUTOMATIC DETECTION OF UNSHIELDED TWISTED PAIR OR SHIELDED TWISTED PAIR CABLING

CROSS REFERENCE TO RELATED APPLICATIONS

This application is a continuation of U.S. application Ser. No. 11/610,381, filed Dec. 13, 2006, which claims the benefit of U.S. Provisional Application No. 60/751,990 filed Dec. 21, 2005, both of which are incorporated herein by reference in its entirety.

FIELD OF THE INVENTION

The invention relates to a transceiver with cable type detection.

BACKGROUND OF THE INVENTION

Unshielded twisted-pair (UTP) cables and shielded twisted-pair (STP) cables are commonly used in local area network (LAN). Generally, UTP cables are more susceptible to crosstalk than STP cables. Crosstalk occurs in twisted pair cabling when energy from one wire pair radiates and couples itself on another adjacent wire pair. In a simplified model, each of the non-transmitting wire pairs acts like an antenna with at least one of the pairs transmitting.

Crosstalk is caused by several factors such as proximity of wire pairs, wire quality, and the number of twist per distance. Standards for UTP and STP cables relating to wire quality and wire application have been developed by the Electronic Industries Association and the Telecommunications Industry Association (EIA/TIA). Among the most popular is the EIA/TIA-568 Standard, which classified twisted pair cables into 7 different categories (Category 1-7).

There are two types of crosstalk: near-end crosstalk (NEXT) and far-end crosstalk (FEXT). In NEXT, crosstalk is measured at the end where one pair is transmitting. In FEXT, crosstalk is measured at the opposite (far) end, FEXT measures the effect of crosstalk from one pair to another over the length of the cable. Two common methods used to measure NEXT crosstalk are pair-to-pair and power sum. In pair-to-pair, the maximum interference caused by one of an active cable pair is measured. In a four pair cable, this method is implemented by having only one of the pairs transmitting. In the power sum method, crosstalk is measured on each pair while all other pairs are transmitting. This latter method is the more preferred method in measuring crosstalk because, in a typical network, data are transmitted over multiple pairs simultaneously.

Several methods are used to minimize crosstalk such as varying the twist rate in each of the wire pairs, terminating the twist as close to the cable terminals at possible, and utilizing adaptive digital crosstalk cancellers.

Adaptive digital crosstalk filters (cancellers) automatically adjust the coefficients of a digital filter to match the coupling function between two channels (two wire pairs). A transceiver has approximately 24 filters one for each possible combination of couplings across a four wire pair cable. Typically, all 24 crosstalk filters are turned on. However, in situations where STP cables are used, all 24 crosstalk filters are not needed. Accordingly, what is need is a transceiver that could determine the cable type being used and to turn the filters off to save power.

BRIEF DESCRIPTION OF THE DRAWINGS/FIGURES

The present invention is described with reference to the accompanying drawings.

DETAILED DESCRIPTION OF THE INVENTION

This specification discloses one or more embodiments that incorporate the features of this invention. The embodiment(s) described, and references in the specification to "one embodiment," "an embodiment," "an example embodiment," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described. An embodiment of the present invention is now described. While specific methods and configurations are discussed, it should be understood that this is done for illustration purposes only. A person skilled in the art will recognize that other configurations and procedures may be used without departing from the spirit and scope of the invention.

Generally, transceivers are designed to operate with both UTP and STP type cables. However, in a network where SIP cables are used, crosstalk is minimal and cancellation filters may not be necessary. In a conventional transceiver, all 24 crosstalk cancellation filters (12 near-end and 12 far-end) must be active at all times, regardless of whether UTP or SIP cabling systems are used. The power dissipated by the crosstalk cancellation filters of such a transceiver is thus wasted when SIP cables are being used.

Figure 1:
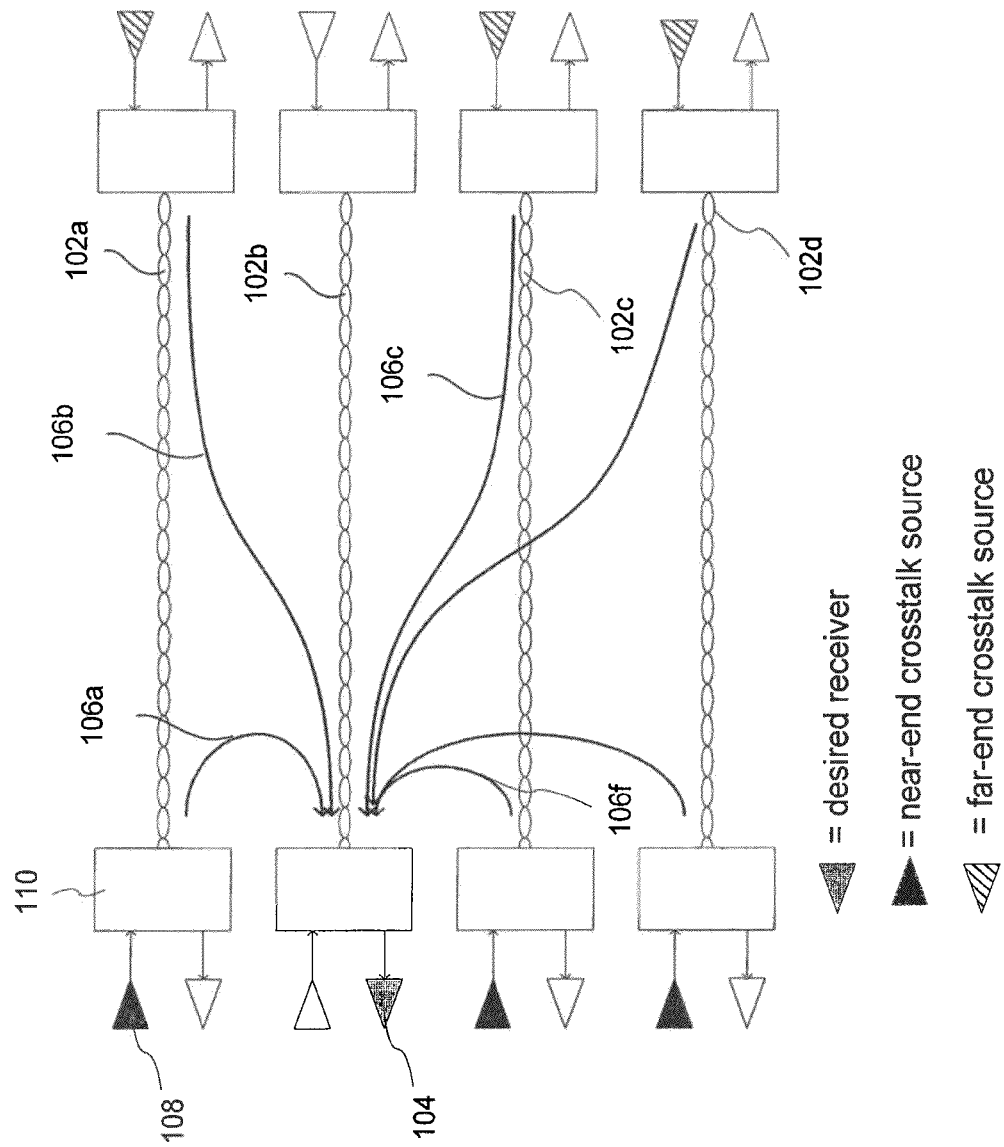
FIG. 1 illustrates crosstalk in a transceiver system utilizing a four UTP cable.

FIG. 1 illustrates the crosstalk phenomenon in a communication system that includes four wire pairs 102*a-d*. Each wire pair is coupled to a transmitter and a receiver, such as transmitter 108 and receiver 104 which transmits and receives information over each of the wire pairs. As shown in FIG. 1, a receiver 104 located on one of the wire pair experiences crosstalk signal (noise) 106*a-f* from various crosstalk sources on other wire pairs. To effectively reduce crosstalk from all of these sources, a crosstalk cancellation filter is needed for each of the crosstalk couplings. For a four pair cable, a total of 12 near-end and 12 far-end cancellation filters are needed. Transmitter 108 and receiver 104 are connected to their corresponding wire pair 202 using a hybrid circuit 110.

Figure 2:
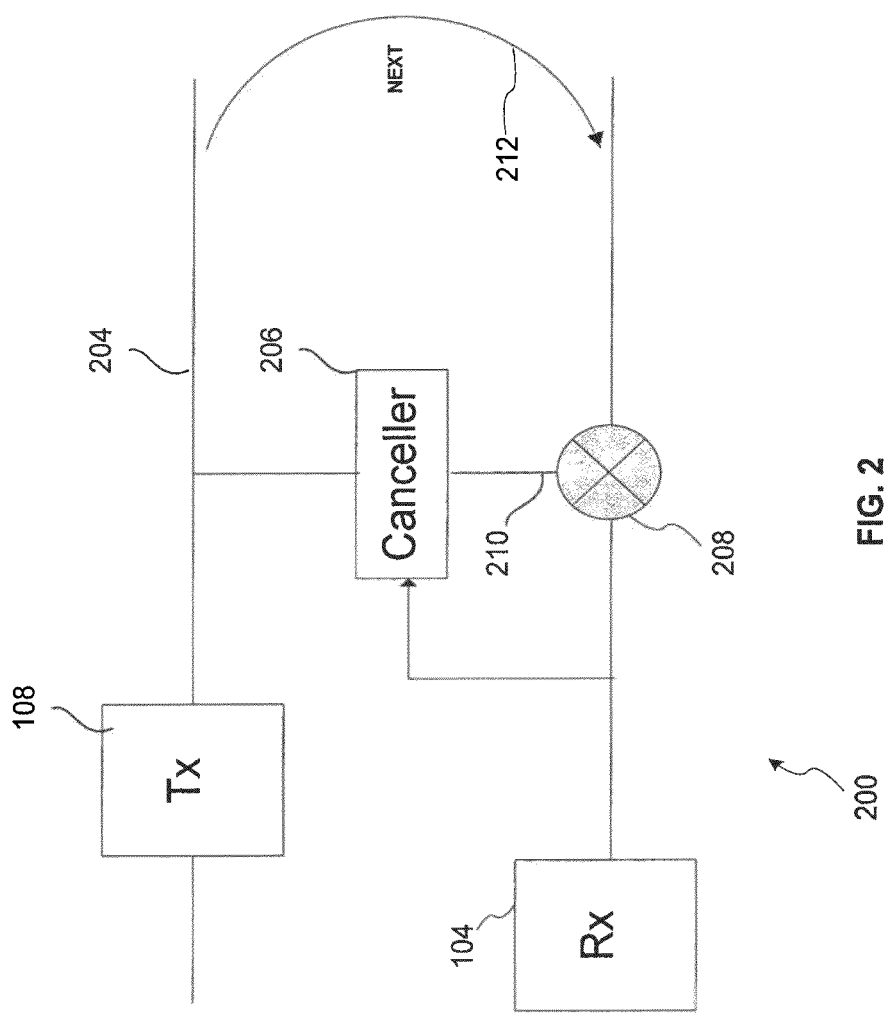
FIG. 2 illustrates a block diagram of an exemplary crosstalk cancellation filter.

FIG. 2 illustrates an exemplary crosstalk cancellation system 200. Crosstalk cancellation system 200 includes a crosstalk canceller 206 that is configured to receive a crosstalk interference signal 212 produced by a nearby transmitting wire pair. In general, canceller 206 has no way of knowing the characteristics of a NEXT interference signal 212. Thus, canceller 206 derives a correction signal 210 using an adaptive feedback algorithm to evaluate and adjust correction errors in successive cycles. Once correction signal 210 is produced, summer 208 adds the correction signal 210 to the NEXT interference signal 210. In this way, a receiver 214 is free from NEXT interference signal 212.

An adaptive feedback algorithm that is well known in the art that could be employed is least means square (LMS). On a high level, the adaptive algorithm compares prior solution to current signal information to correct and update the canceller or filter coefficients. These coefficients are used to correct and generate the new correction signal 210 so as to closely match near-end crosstalk interference signal 212. One clear advantage of the adaptive feedback algorithm is that there is no need to know in advance the relationship between interference signal 212 and the transmitted signal 204.

Implementation of crosstalk cancellation filter in a four pair cabling system is well known in the art. As an example of crosstalk cancellation filters, see U.S. Pat. No. 4,649,505 to Zinser, which is incorporated herein in its entirety.

Figure 3:
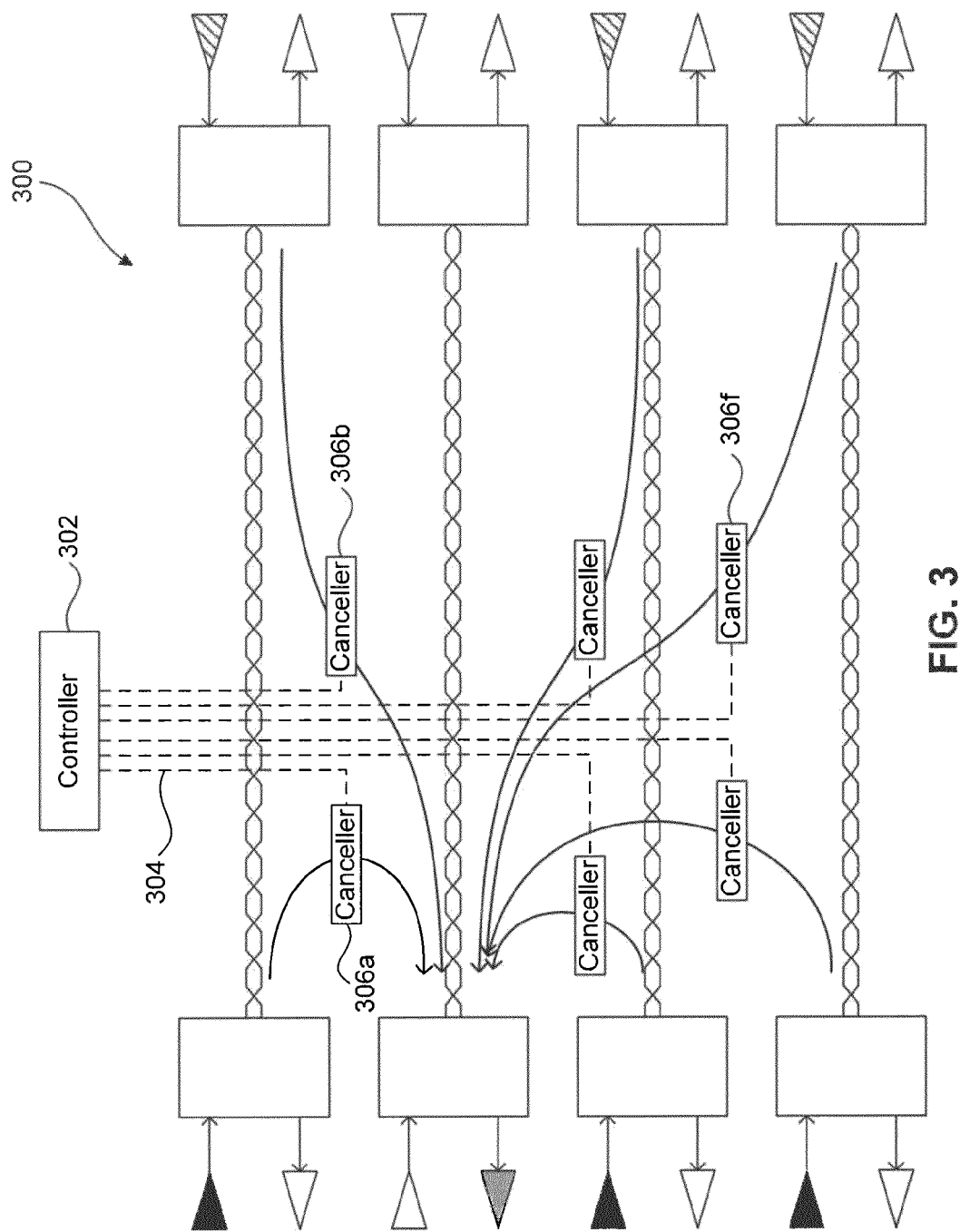
FIG. 3 illustrates a block diagram of an exemplary transceiver according to an embodiment of the present invention.

FIG. 3 illustrates a transceiver 300 according to an embodiment of the present invention. Transceiver 300 includes a plurality of crosstalk cancellation digital filters (canceller) 306a-f. The number of cancellation filters depends on the number of twisted pair cables used in the system. For example, for a four pair UTP cable system, there may be up 24 cancellation filters 12 near-end and 12 far-end filters. Transceiver 300 further includes a controller or analyzer 302. Controller/analyzer 302 could be implemented with hardware or software. In transceiver 300, controller 302 is configured to analyze the correction coefficients and the correction signal of each crosstalk cancellation filter 306. Controller 302 then uses these coefficient and correction signal values to determine whether crosstalk or specifically NEXT is present in the cabling system.

As previously mentioned, UTP cables are more susceptible to NEXT than STP cables. However, conventional transceivers do not evaluate whether NEXT is present and predominant in the system, and consequently all 24 crosstalk cancellation filters are constantly operating. This causes unnecessary power consumption when STP cables are used.

Transceiver 300 determines whether UTP or STP cables are used in the system by using controller 302 to analyze each of the filters' correction coefficients. The coefficients are analyzed because higher coefficient value indicates the canceller is detecting significant interference that needs to be cancelled out. Whereas, low coefficient value indicates relatively little interference. In an embodiment, controller 302 calculates the overall power coefficient value by summing the square of each of the filter's coefficients. If the overall power coefficient is above a predetermined threshold value then transceiver 300 concludes that UTP cables are being used. Contrarily, if the overall power coefficient is below a predetermined threshold value then transceiver 300 concludes that STP cables are being used. If the latter case is true, one or more of the crosstalk cancellation filter in the system would be turned off to save power.

As described above, controller 302 performs several important functions: to monitor the crosstalk of the system; to calculate the overall power coefficient value; and to turn on and off the crosstalk cancellation filters based on the calculation of the overall power coefficient. However, various functions of controller 302 may be delegated to other circuits. In an embodiment, transceiver 300 includes a crosstalk monitoring circuit (not shown) configured to monitor and calculate various crosstalk values such as power sum NEXT of a cable pair and the overall power coefficient of a crosstalk cancellation filter. In this embodiment, the monitoring, circuit is configured to supply these crosstalk values to controller 302 which uses them to determine whether or not crosstalk cancellation filters should be turn off or not.

Generally, there are two types of digital filters. They are finite impulse response (FIR) filter and infinite impulse response (IIR) filter. Both types of filter are widely used in digital signal processing, each of which has its own advantages.

In general, FIR filters are favorable because they are stable, linear phase, and are not limited to the number of computational cycles as they are non-recursive filters. FIR filters are also typically easier to design and implement than IIR filters.

However, IIR filters are more advantageous than FIR filters because they have fewer coefficients, which means fewer registers are required for storing those coefficients. Additionally, IIR filters have better dB magnitude response and less delay time than FIR filters.

Digital filters, in general, have a time-domain difference equation as follows:

$$y(n) = \sum_{i=0}^{N} a_i x(n-i) - \sum_{i=1}^{N} b_i y(n-i)$$

As shown, the output y(n) of a digital filter is equal to the convolution of both the input and output signals of previous cycles combined. Convolution is a weighted accumulation of data points sampled from a signal. The $a_i$ component of the above equation is the feed-forward coefficient of a filter. The $b_i$ component of the above equation is the feedback coefficient. The y(n–i) component is the output value of a "n–i" cycle, and the x(n–i) component is the input of a "n–i" cycle. For FIR filters, the $$\sum_{i=1}^{N} b_i y(n-i)$$

portion of the above equation may be ignored as feedback coefficients of FIR filters are zero.

Figure 4:
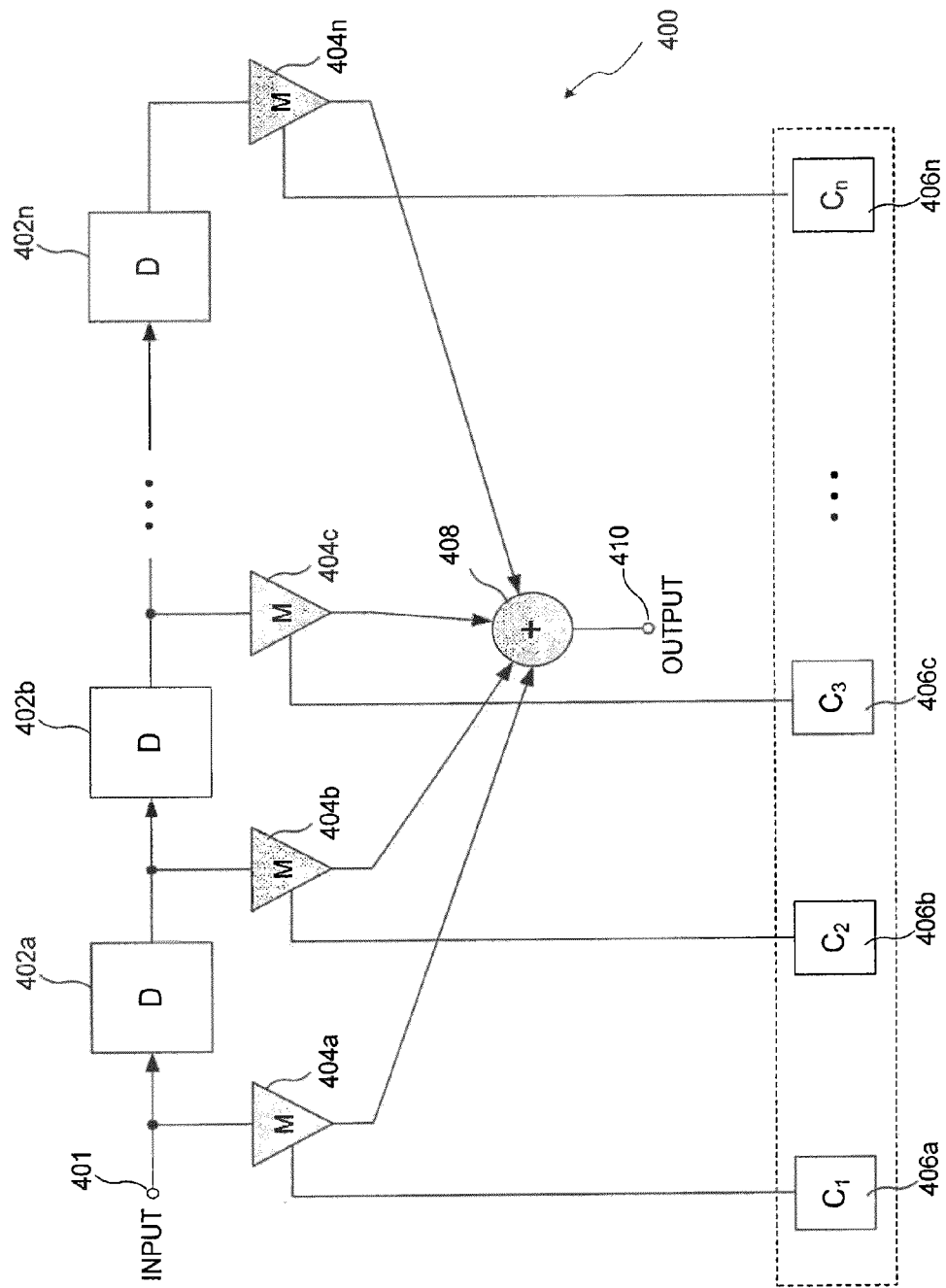
FIG. 4 illustrates an exemplary finite impulse response filter.

FIG. 4 illustrates a common linear-phase FIR filter 400 having n number of delays 402a-n, multipliers 404a-n, register 406a-n, and summer 408. For ease of illustration, filter 400 only shows 4 taps (each tap is a multiplier-delay pair) with the first pair having a delay of zero. A typical FIR filter has 64 taps or more.

In FIR filter 400, an input signal 401 is first provided to delay 402a and multiplier 404a which multiplies the input with a filter coefficient provided by register 406a. The output of multiplier 404a is then supplied to summer 408. As shown, each multiplier 404 has a corresponding register 406 that supplies the multiplier with a filter coefficient value ($C_1$, $C_2$ ... $C_n$). Multiplier 404b also takes input signal 401 and multiplies it with a filter coefficient but after a time delay determined by delay element 402a. Typically, the delay time is determined by the clock of the system. Each subsequent tap of filter 400 is similarly delayed. The output of each multiplier is similarly supplied to summer 408.

After input signal 401 finishes shifting through all of the taps, summer 408 outputs an output signal 410. Ideally, signal 410 is noise free due to the compensating effects of all the filter coefficients that are specifically configured to subtract crosstalk noise that has been added onto input signal 401 during transmission.

As previously stated, controller 302 of transceiver 300 is configured to calculate the overall power coefficient value by summing the square of each of the filter's coefficients. Although not shown, controller 302 is coupled to each of the registers 406*a-n*. In this way, controller 302 can extract the coefficient value from each register for the overall power coefficient calculation.

UTP cables are generally susceptible to have more noise from crosstalk than STP cables. As such, the overall power coefficient value of a crosstalk cancellation filter in a UTP cable system will be more than the overall power coefficient value of a filter in a STP system. The threshold in which transceiver 300 uses to determine whether UTP or STP cables are present may be determined through testing or through known noise levels of UTP and STP systems. The exact value of the threshold is not necessarily important as long as it is sufficient to distinguish between a UTP and a STP system.

It should be noted that either FIR or IIR filters may be used in transceiver 300. Depending on the type of digital filter used, the feed-forward coefficients and/or the feedback coefficients of those filters may be used to calculate the overall power coefficient value.

If transceiver 300 uses IIR filters, either or both of the feed-forward coefficients and feedback coefficients may be used to calculate the overall power coefficient value. In an embodiment, two separate overall power coefficient values are calculated from the filters feed-forward coefficients and feedback coefficients, respectively.

In general, the impulse response of a FIR filter is finite, meaning overtime an impulse input will eventually settle to a zero output. This occurs because the FIR filter is a non-recursive filter as all of its feedback coefficients are zeros. Accordingly, if transceiver 300 uses FIR filters, then the overall power coefficient value will be calculated using only the feed-forward coefficients.

In an alternative embodiment, controller 302 calculates the power sum of each wire pair and compares it to predetermined power sum values of a UTP and STP cabling systems. In this way, transceiver 300 may determine whether it is coupled to UTP or STP cables. To accomplish this task, transceiver 300 is configured drive a reference signal down one or more of the cable pairs to measure the power sum NEXT (PSNEXT) value of an adjacent cable pair that is not transmitting. In other words, PSNEXT is the amount of interference measured in one cable pair when at least one other pair is being driven with a transmit signal.

If the PSNEXT value of the non-transmitting cable pair is above a certain threshold value, then controller 302 may conclude that UTP cables are being used. If the PSNEXT value is below the threshold then controller 302 may conclude that STP cables are being used. In this case, transceiver 300 may shut down one or more of the crosstalk cancellation filters to save power. In an embodiment, transceiver 300 shuts down all of the crosstalk cancellation filters to save power when the PSNEXT value is below the threshold value.

The PSNEXT value of a UTP cable system is more than the PSNEXT value of a STP cable system as UTP cables are generally more noisy than STP cables. Similar to the overall power coefficient threshold value, the PSNEXT threshold value in which transceiver 300 uses to determine whether UTP or STP cables are present may be determined through testing or through known noise levels of UTP and STP systems. The exact value of the PSNEXT threshold is not necessarily important as long as it is sufficient to distinguish between a UTP and a STP system.

Figure 5:
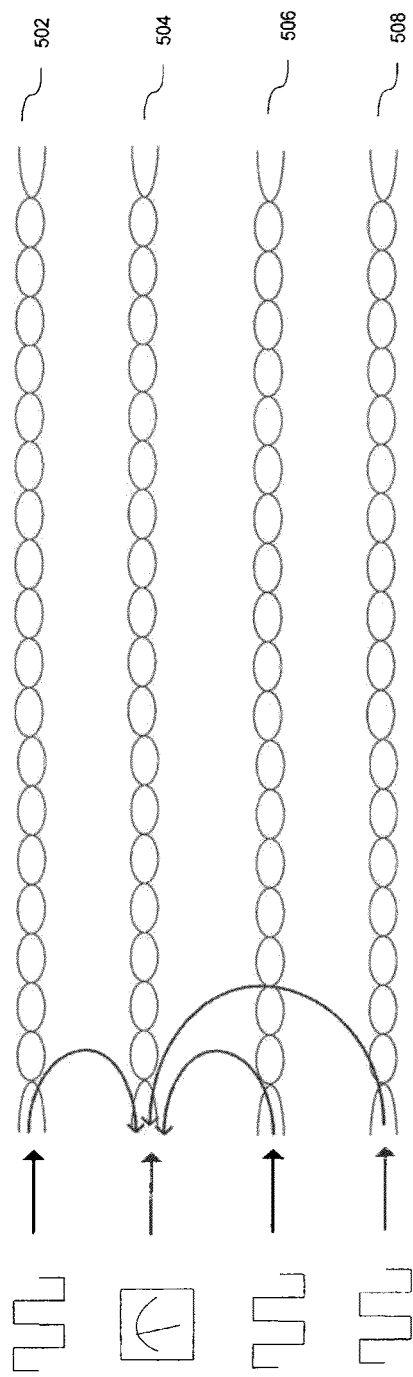
FIG. 5 illustrates an exemplary method for measuring power sum near end cross talk (PSNEXT).

PSNEXT value can either be calculated or measured. FIG. 5 illustrates how PSNEXT is measured in a four cable pair system. As shown, test signals are send through 3 of the cable pairs while crosstalk measurement is made on the fourth pair. The PSNEXT value of a cable pair could also be calculated by measuring the pair-to-pair crosstalk value against 3 other pairs. For example, to calculate the PSNEXT for cable pair 502, 3 pair-to-pair crosstalk measurements need to be made in the following ways: 1) measure crosstalk between pair 502 and pair 504; 2) measure crosstalk between pair 502 and pair 506; and 3) measure crosstalk between pair 502 and pair 508. Using these three measurements, the PSNEXT value for cable pair 502 can be determined. Other methods for measuring the PSNEXT value for a cable pair could also be used and are commonly understood by a person skilled in the art.

It should be understood that other metrics relating to filter correction coefficients could also be used to determine the level of crosstalk in the system.

Figure 6:
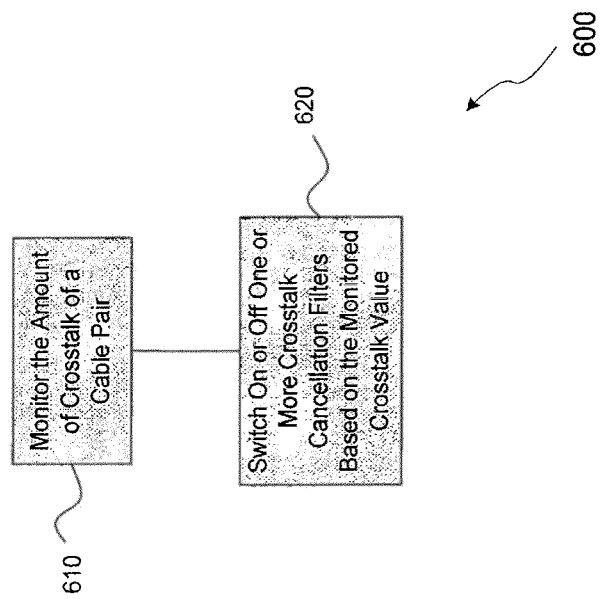
FIG. 6 illustrates an exemplary flow diagram of a method to save power usage of a transceiver according to an embodiment of the present invention.

FIG. 6 illustrates a method 600 for monitoring crosstalk in a transceiver and for managing power usage of a transceiver according to an embodiment of the present invention. Method 600 is applicable to a transceiver that has a plurality of communication ports configured to receive and transmit signals over a plurality of cable pairs. Method 600 may also be implemented in other transceiver configurations without changing its scope.

In step 610, transceiver 300 or the crosstalk monitoring circuit (not shown) monitors the amount of crosstalk of one of the plurality of cable pairs. Transceiver 300 may also be configured to monitor more than one cable pairs or all of the cable pairs.

In step 620, transceiver 300 switches one or more of the crosstalk cancellation filters coupled to one of the communication ports on or off based on the monitored amount of crosstalk. As mentioned above, STP cables are less prone to crosstalk than MT cables. A communication network that uses STP cable rather than UTP cables will have less crosstalk. Thus, if transceiver 300 determines that the amount of crosstalk is low and below a predetermined threshold, then it could conclude that SIP cables are being used and turn off one or more of the crosstalk cancellation filters. If the amount of crosstalk is above the predetermined threshold, then transceiver 300 or controller 302 will switch on one or more of the crosstalk cancellation filters. In an embodiment, all crosstalk cancellation filters will be switched on or off if crosstalk is low, indicating STP cable.

Figure 7:
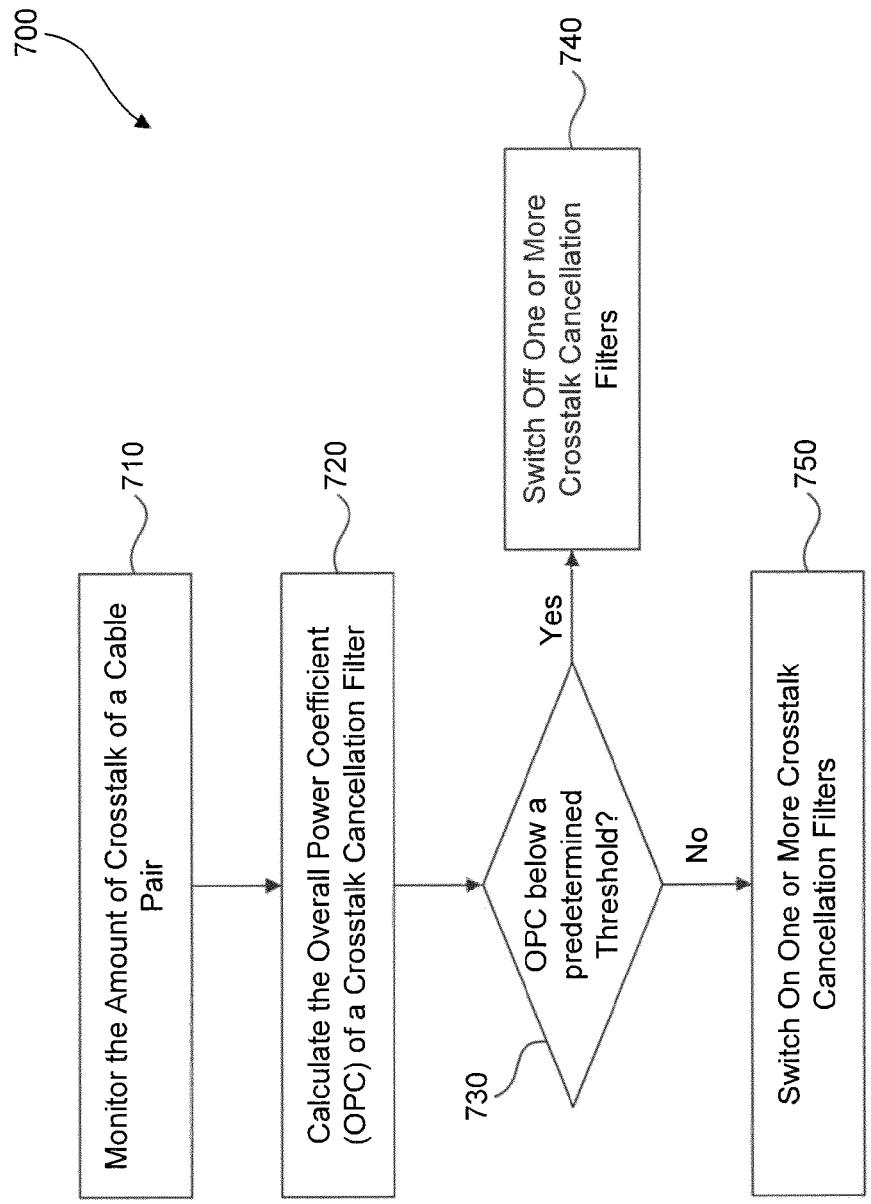
FIG. 7 illustrates an exemplary flow diagram of a method to determine whether trip or SIP cables are present according to an embodiment of the present invention.

FIG. 7 illustrates a method 700 for managing power usage of the transceiver according to an embodiment of the present invention. In step 710, transceiver 300 or the crosstalk monitoring circuit (not shown) monitors the amount of crosstalk of one of the plurality of cable pairs. Similar to method 600, transceiver 300 of method 700 may also be configured to monitor more than one cable pairs or all of the cable pairs.

In step 720, transceiver 300 or monitoring circuit determines the overall power coefficient of a crosstalk cancellation filter by summing the square of each of the filter's coefficient. As previously shown in FIG. 4, filter coefficients are supplied by registers 406*a-n* to each of the filter's multipliers and also to the monitoring circuit. A high overall power coefficient value means a lot of crosstalk noise is present since the filter coefficients are used to generate a correction signal so as to closely match near-end or far-end crosstalk interference signal. Likewise, a low overall power coefficient value means little crosstalk noise is present.

In step 730, transceiver 300 determines if the overall power coefficient value is below a predetermined threshold. If the answer is yes, then transceiver 300 may conclude that STP cables are being used in the communication links and switch off one or more of the crosstalk cancellation filters, as shown in step 740. In an embodiment, all crosstalk cancellation filters are switched off if the overall power coefficient value is below the predetermined threshold.

If the answer is no in step 730, then transceiver 300 may conclude that UTP cables are being used in the communication links and switch on one or more of the crosstalk cancellation filters, as shown in step 750. In an embodiment, all crosstalk cancellation filters are switched on when the overall power coefficient value is above the predetermined threshold value.

Figure 8:
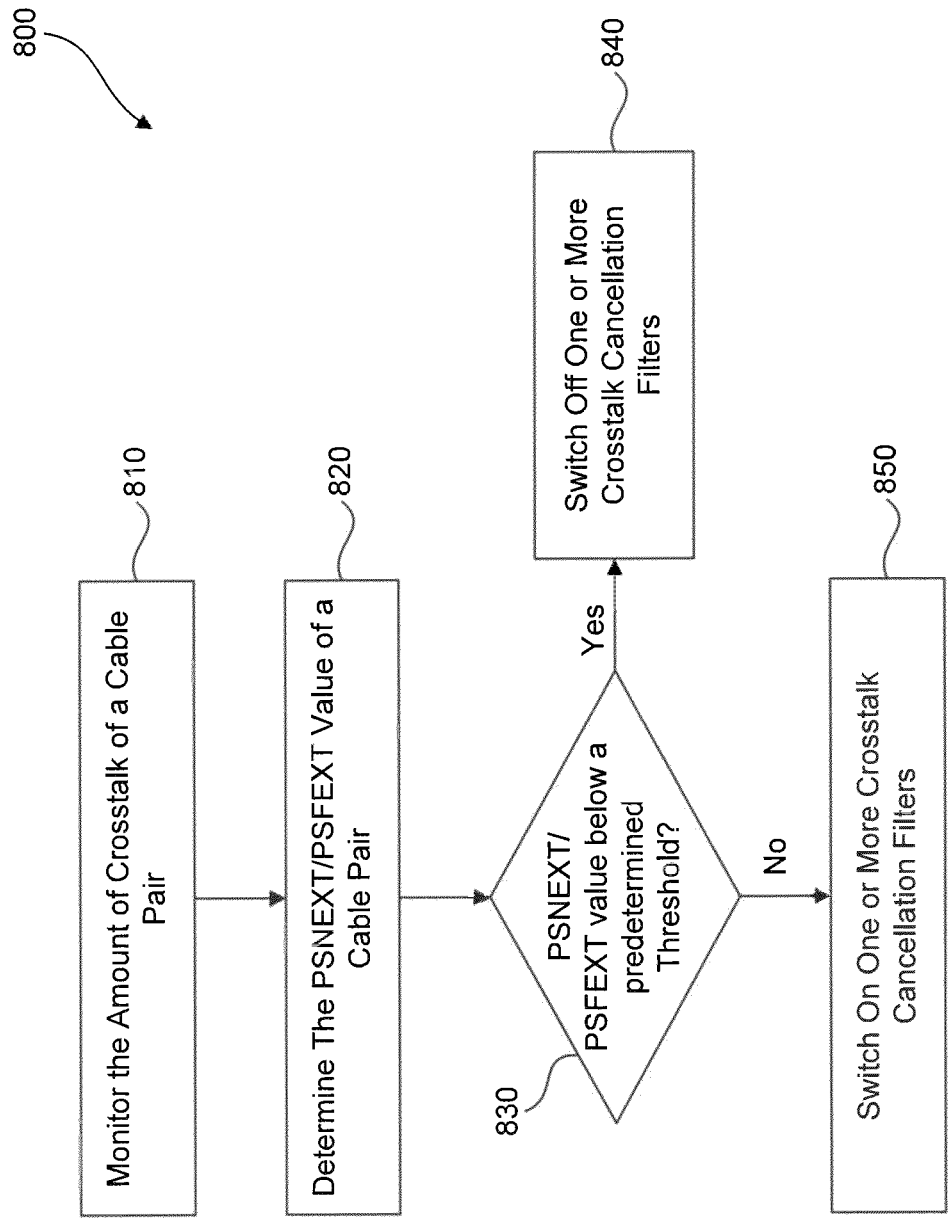
FIG. 8 illustrates an exemplary flow diagram of a method to save power usage of a transceiver according to an embodiment of the present invention.

FIG. 8 illustrates a method 800 for monitoring crosstalk in a transceiver and for managing power usage of the transceiver according to another embodiment of the present invention. In step 810, transceiver 300 or the crosstalk monitoring circuit (not shown) monitors the amount of crosstalk of one of the plurality of cable pairs.

In step 820, transceiver 300 or monitoring circuit determines the PSNEXT value of a cable pair. The PSNEXT value can be measured by sending test signals through one or more of the wire pairs while taking crosstalk measurement on a non-transmitting pair coupled to a target receiver. The PSNEXT value can also be calculated by measuring the pair-to-pair crosstalk value against other pairs as previously described above.

In an alternative embodiment, instead of monitoring the PSNEXT value of a cable pair, transceiver 300 monitors and estimates the power sum far end crosstalk (PSFEXT) of a cable pair to determine whether UTP or SIP cables are being used. The determination of the PSFEXT value is similar to the determination of the PSNEXT value and is commonly understood by one skilled in the art.

In step 830, transceiver 300 determines if the PSNEXT or PSFEXT value is below a predetermined threshold. If the answer is yes, then transceiver 300 can conclude that SIP cables are being used in the communication links and switch off one or more of the crosstalk cancellation filters, as shown in step 840. It should be noted that the PSNEXT or PSFEXT value of a cable pair is lower in a SIP system than the PSNEXT or PSFEXT value of a cable pair in a UTP system.

In an embodiment, all crosstalk cancellation filters are switched off when transceiver 300 determines that the PSNEXT or PSFEXT value is below the predetermined threshold.

If the answer is no in step 830, then transceiver 300 can conclude that UTP cables are being used in the communication links and switch on one or more of the crosstalk cancellation filters, as shown in step 850. In an embodiment, all crosstalk cancellation filters are switched on when the PSNEXT or PSFEXT value of a cable pair is above a predetermined PSNEXT or PSFEXT threshold value.

CONCLUSION

While various embodiments of the present invention have been described above, it should be understood that they have been presented by way of example only, and not limitation. It will be apparent to persons skilled in the relevant art that various changes in harm and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A transceiver having a plurality of communication ports configured to receive and transmit signals over a plurality of cable pairs, the transceiver comprising:
   a plurality of crosstalk cancellation filters coupled to the plurality of communication ports;
   a monitoring circuit configured to determine an amount of crosstalk equal to a power sum near end crosstalk (PSNEXT) value or a power sum far end crosstalk (PSFEXT) value of one of the plurality of cable pairs; and
   a controller configured to switch the plurality of crosstalk cancellation filters on or off based on the amount of crosstalk equal to the PSNEXT value or the PSFEXT value of the one of the plurality of cable pairs.

2. The transceiver of claim 1, wherein the controller is further configured to compare the amount of crosstalk to a predetermined threshold value.

3. The transceiver of claim 2, wherein the controller is further configured to turn off the plurality of crosstalk cancellation filters if the amount of crosstalk is below the predetermined threshold value.

4. The transceiver of claim 3, wherein the predetermined threshold value is below a power sum crosstalk value of an unshielded twisted pair (UTP) cable.

5. The transceiver of claim 3, wherein the predetermined threshold value is above a power sum crosstalk value of a shielded twisted pair (STP) cable.

6. The transceiver of claim 1, wherein the monitoring circuit is further configured to determine an overall power coefficient value of one of the plurality of crosstalk cancellation filters by summing the squares of filter coefficients of said one of the plurality of crosstalk cancellation filters.

7. The transceiver of claim 1, wherein the plurality of crosstalk cancellation filters include a finite impulse response (FIR) filter or an infinite impulse response (IIR) filter.

8. A method of controlling a transceiver having a plurality of communication ports configured to receive and transmit signals over a plurality of cable pairs, the method comprising:
   determining an amount of crosstalk equal to a power sum near end crosstalk (PSNEXT) value or a power sum far end crosstalk (PSFEXT) value of one of the plurality of cable pairs; and
   switching on or off a plurality of crosstalk cancellation filters coupled to the plurality of communication ports based on the amount of crosstalk equal to the PSNEXT value or the PSFEXT value of the one of the plurality of cable pairs.

9. The method of claim 8, further comprising comparing the amount of crosstalk to a predetermined threshold value.

10. The method of claim 9, further comprising turning off the plurality of crosstalk cancellation filters if the amount of crosstalk is below the predetermined threshold value.

11. The method of claim 9, wherein the predetermined threshold value is below a power sum crosstalk value of an unshielded twisted pair (UTP) cable.

12. The method of claim 9, wherein the predetermined threshold value is above a power sum crosstalk value of a shielded twisted pair (STP) cable.

13. The method of claim 8, further comprising determining an overall power coefficient value of one of the plurality of crosstalk cancellation filters by summing the squares of filter coefficients of one of the plurality of crosstalk cancellation filters.

14. The method of claim 8, wherein the plurality of crosstalk cancellation filters include a finite impulse response (FIR) filter or an infinite impulse response (IIR) filter.

15. A transceiver coupled to a communications link, comprising:
- a transmitter coupled to the communications link;
- a receiver coupled to the communications link;
- a crosstalk cancellation filter, coupled to an input of the receiver, configured to cancel a crosstalk interference signal caused by the transmitter; and
- a controller configured to turn on or off the crosstalk cancellation filter based on filter coefficients of the crosstalk cancellation filter.

16. The transceiver of claim 15, wherein the controller is configured to calculate an overall power coefficient value by summing squares of the filter coefficients of the crosstalk cancellation filter.

17. The transceiver of claim 15, wherein the controller is further configured to compare the overall power coefficient value to a predetermined threshold value, and to turn off the crosstalk cancellation filter if the overall power coefficient value is below the predetermined threshold value.

18. The transceiver of claim 17, wherein the predetermined threshold value is below an overall power coefficient value associated with an unshielded twisted pair (UTP) cable.

19. The transceiver of claim 17, wherein the predetermined threshold value is above an overall power coefficient value associated with a shielded twisted pair (STP) cable.

20. The transceiver of claim 15, wherein the crosstalk cancellation filter comprises a finite impulse response (FIR) filter or an infinite impulse response (IIR) filter.

\* \* \* \* \*